United States Patent [19]

Fradenburgh et al.

[11] Patent Number: 4,648,800
[45] Date of Patent: Mar. 10, 1987

[54] COMPOSITE FLEXBEAM FOR A ROTARY WING AIRCRAFT

[75] Inventors: Evan A. Fradenburgh, Fairfield; Edmond F. Kiely, Stratford; Gordon G. Miller, Shelton, all of Conn.

[73] Assignee: United Technologies Corporation, Hartford, Conn.

[21] Appl. No.: 610,370

[22] Filed: May 15, 1984

[51] Int. Cl.⁴ .............................................. B64C 11/26
[52] U.S. Cl. .................................. 416/134 A; 416/230
[58] Field of Search .......... 416/134 A, 134 R, 230 A, 416/230 R, 226

[56] References Cited

U.S. PATENT DOCUMENTS

| | | |
|---|---|---|
| 3,669,566 | 6/1972 | Bourquardez et al. ......... 416/134 A |
| 4,037,988 | 7/1977 | Laird ................................ 416/226 X |
| 4,111,605 | 9/1978 | Roman et al. ....................... 416/141 |

Primary Examiner—Leonard E. Smith
Attorney, Agent, or Firm—Alan C. Cohen

[57] ABSTRACT

A fiber reinforced composite flexbeam which has torsionally stiff inboard and outboard end portions which taper down to form a torsionally soft, resilient, solid medial web portion is disclosed. Such a flexbeam may be used as a structural member in rotor connectors for a rotary wing aircraft to connect the rotor blade to the rotor hub.

4 Claims, 6 Drawing Figures

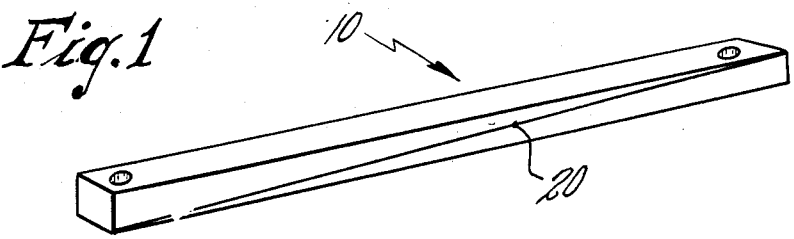
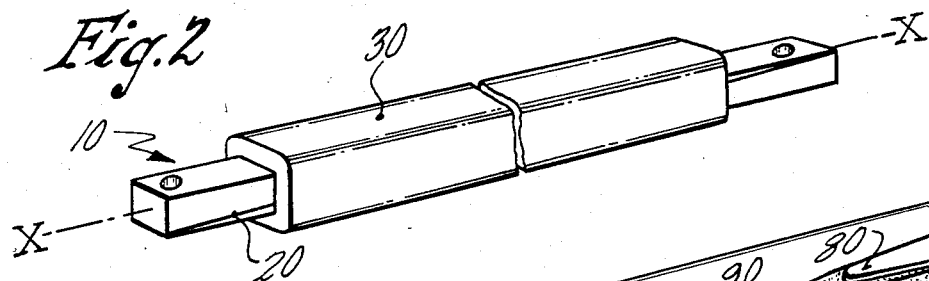
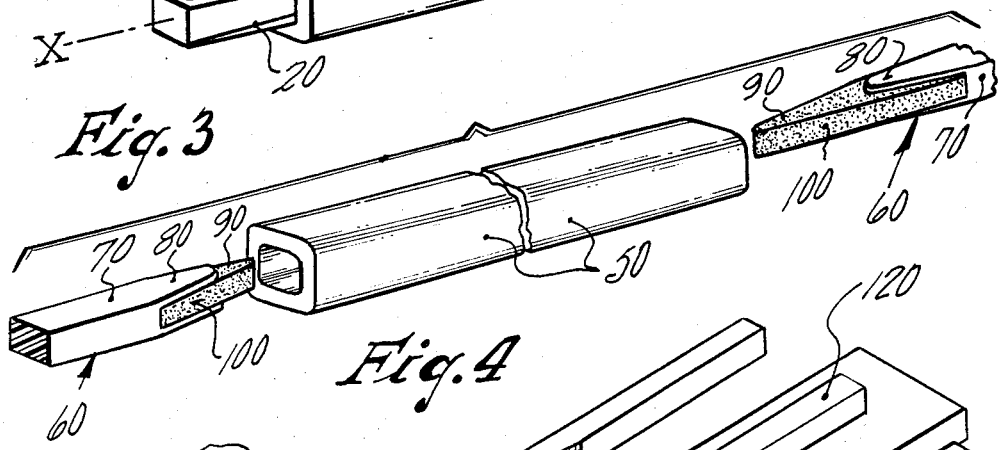
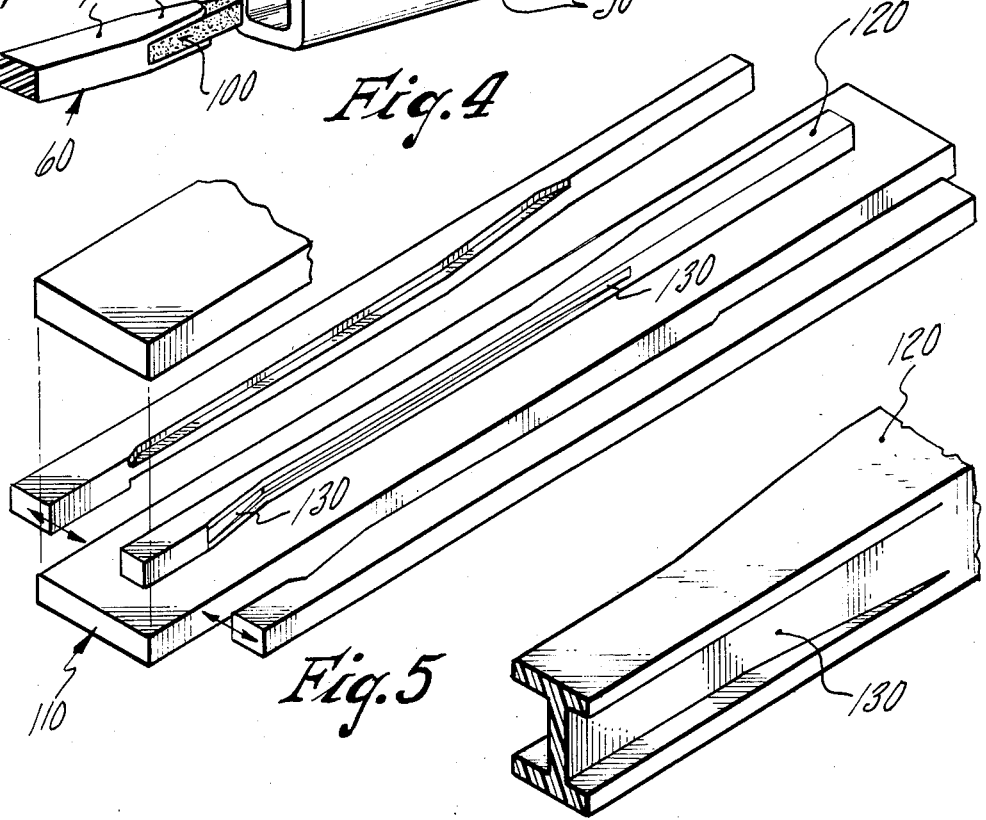

COMPOSITE FLEXBEAM FOR A ROTARY WING AIRCRAFT

CROSS REFERENCE TO RELATED APPLICATIONS

This application relates to U.S. application Ser. No. 610,371, filed on even date herewith by Evan A. Fradenburgh, Edmond F. Kiely and Gordon G. Miller for METHOD OF FORMING A FIBER REINFORCED COMPOSITE ARTICLE OF COMPLEX CONFIGURATION and is herein incorporated by reference.

DESCRIPTION

1. Technical Field

The technical field to which this invention pertains is fiber reinforced composite articles having areas of varying strength.

2. Background Art

Over the years, the helicopter industry has tried to develop a less complicated, bearingless rotor system. Typically, the system comprises a rotor hub to rotate the blades, and a rotor connector to connect the rotor blade to the rotor hub and to effect blade pitch change for flight control. Such rotor connectors contain a pitch rod or torque tube assembly which runs from the rotor hub to the inboard end of the rotor blade and is capable of applying sufficient torque to the blade to alter the pitch to the desired angle (generally up to about 30° or more). These rotor connectors also contain at least one flexbeam, which act as structural members attaching the rotor hub to the rotor blade and supporting the pitch rod assembly. Such flexbeams, in addition to being structural support, undergo significant distortion when the pitch rod is activated and the blade pitch is altered. Since the amount of torque required to alter the pitch of the blade is the accumulated torque required to change the pitch of the blade and distort the flexbeam, it is detrimental to have a flexbeam which has a high torsional stiffness. It should be apparent that, the higher the torsional stiffness of the flexbeam, the more torque is required to alter the pitch of the blade and the heavier the equipment must be to produce such torque, all of which add cost and weight to the system.

Therefore, what is needed in the art is a flexbeam structure which can be used in these and future rotor hubs of this design and is lightweight, strong, resilient and does not significantly contribute to the torsional stiffness of the rotor connector.

DISCLOSURE OF INVENTION

The present invention is a lightweight, resilient, fiber reinforced composite flexbeam which comprises a fiber reinforced composite outer structure having torsionally stiff inboard and outboard end portions which taper down to a thin, resilient, torsionally soft, solid web medial portion. The inboard end and outboard end portions are reinforced with either metallic or fiber reinforced composite doublers which enhance the structural integrity at attachment areas and also provide a smooth transition from the torsionally stiff end portions to the torsionally soft, medial portions.

Other features and advantages will be apparent from the specification and claims and from the accompanying drawings which illustrate an embodiment of the invention.

BRIEF DESCRIPTION OF THE DRAWINGS

FIG. 1 shows a split, rectangular mandrel which may be used to practice this invention.

FIG. 2 shows a lay-up about the mandrel.

FIG. 3 shows the lay-up with the mandrel removed and reinforcements to be inserted.

FIG. 4 shows a typical matched mold and resulting composite structure.

FIG. 5 shows a cross section of the resulting composite flexbeam.

BEST MODE FOR CARRYING OUT THE INVENTION

Figure 6:
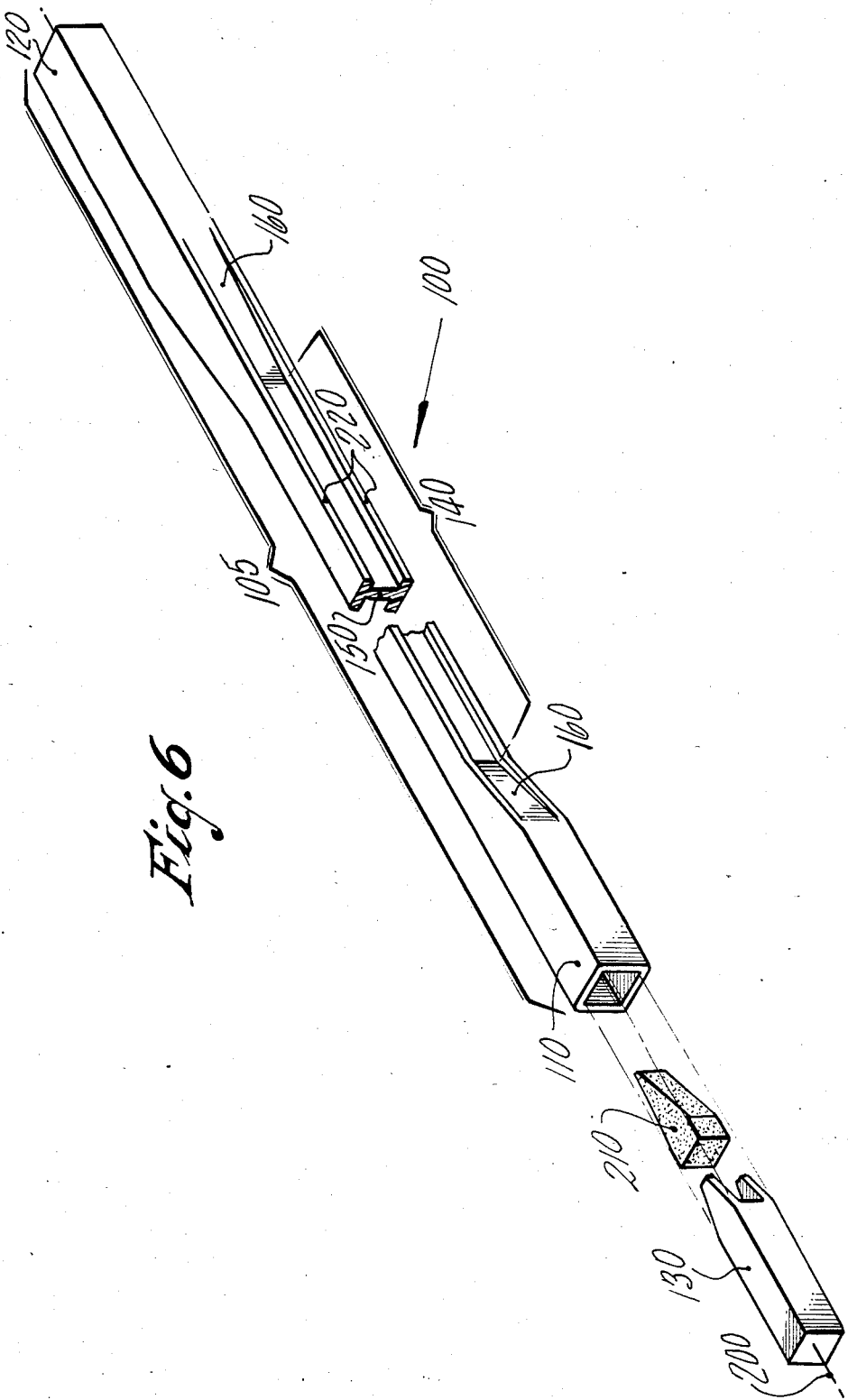
FIG. 6 illustrates a composite flexbeam according to the present invention.

Referring to FIG. 6, the article of the present invention comprises a unitary outer structure 105 of fiber reinforced composite material having an inboard end portion 110 and an outboard end portion 120 connected by a thin medial web portion 140. The inboard end portion 110 is a thick, torsionally stiff area which tapers down via a ramp 160 to form a thin, torsionally soft, solid, web 150 having substantially an I-beam cross-section, with flanges 220 which run along the longitudinal axis 200 and then fairs out via a ramp 160 to form a thick, torsionally stiff outboard end portion 120. Both the inboard end portion 110 and outboard end portion 120 may be aligned along the center of the longitudinal axis 200 of the flexbeam 100. Although FIG. 6 shows the end portions to be on opposite sides of the axis in order to create a certain end fixity, it is not necessary to configure the flexbeam as such.

The unitary outer structure 105 is comprised of fiber reinforced composite material which forms an article having low torsional stiffness. The low torsional stiffness of such articles is a function of the cross-section of the medial portion; the angle at which the fibers of the unitary outer structure are wound about the longitudinal axis and the modulus of elasticity of the fibers used. Such fibers should be wound such that the fibers are oriented as nearly parallel to the longitudinal axis as possible to produce the greatest torsional softness. However, when the angle is quite low, below about 5°, the shear stresses generated when the beam is twisted threaten the integrity of the flexbeam. Generally, the range will be from about 5° to about 30° with about 15° being preferred. It is believed that angles above 30° should be avoided because of their adverse effects on torsional flexibility.

Depending on the torsional stiffnesses required, and this will vary with the application of the flexbeam and requirements of the particular aircraft, other conventional reinforcing fibers may also be used, for example, graphite, carbon, etc. The matrix material which may be used to form this unitary structure may be any of the conventional thermosetting resins, for example epoxy, polyamide, polyimide, etc. Preferably, these materials will have a high fracture toughness and low torsional stiffness. The matrix typically constitutes about 30% to about 70% by volume of the outer structure.

Both the inboard and the outboard end portions are used as attachment points for the rotor hub and the rotor blade respectively. It is imperative that both attachment points be torsionally stiff and structurally sound. In order to achieve both torsional stiffness and structural integrity, reinforcing doublers are inserted into the end portions of the unitary structure to improve these characteristics. Such reinforcements extend from the outer end of each end portion of the flexbeam inward to the web portion. Such doublers are generally contoured to conform to the desired shape of the connector to which the flexbeam will be attached, i.e. oval, square, round, rectangular, etc.

Such doublers may be formed of a torsionally stiff material such as steel or other metal or a torsionally stiff composite material, i.e. graphite reinforced epoxy or other conventional composite fiber reinforced matrix combination. Such composite fiber reinforced material should have high fracture toughness. Typically, these doublers are tapered to conform to the taper in the flexbeam which runs from the inboard and the outboard portion to the web portion. Such a taper allows for an acceptably smooth transition from the torsionally stiff end portion to the torsionally soft medial portion. The ramp should decrease in thickness at a rate of less than 6:1 so as not to create unacceptable stress points in the flexbeam structure when it is carrying centrifugal loads.

The doublers may be formed of more than one component, i.e. a graphite and epoxy outermost section 130 and a closed cell polyurethane foam innermost portion 210. Such components should have a higher torsional stiffness in the outermost portion and an intermediate torsional stiffness, compared to the medial web, to the innermost portion, thereby creating an even smoother torsional transition from the stiff end portions to the torsionally soft web portion.

EXAMPLE

A torsional flexbeam was prepared using the disclosed process as follows:

A rectangular mandrel 10 (FIG. 1) which was split diagonally 20 along its longitudinal axis was used. The mandrel was about .40 inch square and about 15 inches in length and made of steel. Four layers of preimpregnated glass fibers 30 (FIG. 2) were wrapped tightly about the mandrel 10. The cloth 30 was wrapped such that the fiber orientation was ±15 to the longitudinal axis X of the mandrel. The cloth 30 was purchased from the 3-M Corporation and comprised E-Glass and SP 114 resin.

The layers were wrapped such that the end of each layer was on a different side of the mandrel 10. Each layer was 0.0068 inch thick and the resulting cured composite was 0.028 inch thick.

The resulting wet lay-up and mandrel were then placed in a plastic bag and put into a freezer to cool them down to 0° F. (−17.8° C.). The plastic bag was used to reduce moisture absorption from the freezer onto the lay-up.

After the wet lay-up had cooled to temperature, it was removed from the freezer, and taken out of the plastic bag. While still cold, the mandrel 10 was removed from the chilled lay-up by tapping it free with a hammer and drawing it out of the lay-up, leaving a stiff, cold, hollow lay-up 50 (FIG. 3).

Reinforcing doublers 60 were then inserted into each end of the hollow chilled lay-up 50. The doublers 60 comprised graphite reinforced epoxy resin composites which were layed up and cured using conventional techniques. These doublers were made by stacking ten layers of graphite fiber, preimpregnated with RAC 6350 epoxy, alternating each layer 0/±45 to the previous layer. The resulting stack was then cured and was molded to fit snuggly inside of the hollow wet lay-up 50. These doublers 60 were made such that they had a clevis 90 at one end in which to insert a preformed foam structure 70. The foam structure 70 was designed with a ramp 80 on one surface to impart a ramp shape to the final composite article after compaction. One doubler 60 was four inches long while the other was 1.5 inches long. The foam inserts 70 were 2.5 inches long and 1 inch long respectively. These foam inserts 70 were attached to the doublers 60 by an adhesive (EA 9309.3NA available from Hysol Corporation).

The doublers 60 with the foam inserts were coated with AF 126-2 (available from the 3-M Corporation), adhesive and then placed into the chilled, hollow, wet lay-up 50 with the foam ramp surfaces facing 180° from each other. The outer surface of the wet lay-up is then wrapped in a layer of Angel's hair to reduce the tackiness of the matrix material thus allowing the match mold to slip over the surface of the lay-up easily. This will reduce the possibility of crimping some of the fibers during the foaming process. The reinforced lay-up was then placed into the mold 110 and the mold was assembled, shaping the hollow lay-up into the desired form. The mold 110 was then clamped together with bolts, fixtured with shear pins and heated for 2 hours at a temperature of 250° F. (121.1° C.) to cure the resin matrix.

It was determined that in making composite articles having longitudinally oriented ramped portions, the ramped portion must be made long enough and at a gentle enough angle (less than about 10°), to avoid fibers wrinkling during compaction.

The mold was then cooled and disassembled and the finished flexbeam 100 removed.

The resulting composite article was of near net shape and contained continuous fibers throughout that portion of the article formed from the hollow lay-up. Such continuity of fibers produces a structurally superior composite article to those having discontinuous fibers.

This process is ideally suited for the production of I-beams, C-beams and other like articles which have compacted areas. In addition, through the proper placement of stiffeners and the like, composite articles, which have torsionally soft, resilient portions and torsionally stiff portions, may be easily manufactured as well. Such articles will find uses as flexbeams in rotor wing aircraft for attaching rotor blades to rotor hubs.

The flexbeams of the present invention are lightweight, resilient, strong and do not contribute significantly to the torsional stiffness of the rotor connectors in which they will be used. Such flexbeams will allow for easier control of the aircraft in flight due to the ease in changing the blade pitch. In addition, the lightness of these flexbeams will reduce the weight of the aircraft. A further advantage which is inherent in most composites is that they are typically more failsafe in that they do not fail completely such as metal component parts do, because they do not propagate cracks which may develop during flight or by hostile gunfire. Such rotor connectors using these fiber composite flexbeams will, therefore, be lighter, easier to control and safer.

Although the invention has been shown and described with respect to detailed embodiments thereof, it should be understood by those skilled in the art that various changes and omissions in form and detail may be made therein without departing from the spirit and the scope of the invention.

We claim:

1. A fiber reinforced composite flexbeam for mounting a variable pitch blade to a rotatable hub thereof, said flexbeam being characterized by a unitary outer structure of continuous, fiber reinforced, thermosetting epoxy resin material having torsionally stiff, thick inboard and outboard end portions, each of which end portions tapers down to a torsionally soft, thin, solid, medial web portion, wherin the end portions are reinforced with reinforcing doublers.

2. The flexbeam of claim 1 wherein the fiber orientation of the outer structure is about ±30° or less to the longitudinal axis of the flexbeam.

3. The flexbeam of claim 1 wherein the fibers of the outer structure comprise glass fibers and the matrix is epoxy.

4. The flexbeam of claim 1 wherein the change in torsional stiffness from one end portion of the flexbeam to the other end portion of the flexbeam is about 2 orders of magnitude.

* * * * *